(12) United States Patent
Lv et al.

(10) Patent No.: US 12,393,062 B2
(45) Date of Patent: Aug. 19, 2025

(54) AUTOMATIC RIGHTING SYSTEM AND METHOD, AND GLASSES

(71) Applicant: Luxshare Precision Technology (Nanjing) Co., LTD, Nanjing (CN)

(72) Inventors: Gaofeng Lv, Nanjing (CN); Cheng Wang, Nanjing (CN); Chunguang Li, Nanjing (CN); Zhongyu Wu, Nanjing (CN); Yajuan Gao, Nanjing (CN); Birong Jiang, Nanjing (CN); Ran You, Nanjing (CN); Guojun Xu, Nanjing (CN)

(73) Assignee: LUXSHARE PRECISION TECHNOLOGY (NANJING) CO., LTD, Nanjing (CN)

( * ) Notice: Subject to any disclaimer, the term of this patent is extended or adjusted under 35 U.S.C. 154(b) by 442 days.

(21) Appl. No.: 18/091,744

(22) Filed: Dec. 30, 2022

(65) Prior Publication Data

US 2024/0094563 A1     Mar. 21, 2024

(30) Foreign Application Priority Data

Sep. 20, 2022   (CN) .......................... 202211144165.7

(51) Int. Cl.
*G02C 11/00*     (2006.01)
*G02C 5/14*      (2006.01)
*G06F 3/0354*    (2013.01)

(52) U.S. Cl.
CPC ................ *G02C 11/10* (2013.01); *G02C 5/14* (2013.01); *G06F 3/03547* (2013.01)

(58) Field of Classification Search
CPC .......... G02C 11/10; G02C 11/00; G02C 5/14; G02C 5/001; G06F 3/03547; G06F 1/163; G02B 27/0176; G02B 2027/0178
(Continued)

(56) References Cited

U.S. PATENT DOCUMENTS

| 9,880,441 B1 * | 1/2018 | Osterhout | G02B 27/0172 |
| 11,726,337 B1 * | 8/2023 | Huang | G02B 27/0149 345/80 |

(Continued)

FOREIGN PATENT DOCUMENTS

| CN | 201965335 U | 9/2011 |
| CN | 105223908 A | 1/2016 |

(Continued)

OTHER PUBLICATIONS

Chinese Office Action and Search Report for Chinese Application No. 202211144165.7, dated Mar. 28, 2025, with English translation.

*Primary Examiner* — William R Alexander
(74) *Attorney, Agent, or Firm* — Birch, Stewart, Kolasch & Birch, LLP

(57) ABSTRACT

An automatic righting system includes a discrimination calibration module, a righting module, and a controller. The discrimination calibration module includes a distance sensing unit. The distance sensing unit is located at the front end of the glasses and configured to acquire the distance between the distance sensing unit and a first feature position. The righting module includes a push-up air cushion. The push-up air cushion is mounted at the front end of the glasses. The push-up air cushion is configured to be inflated to push the glasses to move upward. The controller is electrically connected to the distance sensing unit and the push-up air cushion. The controller is configured to control the push-up air cushion to start or stop to right the glasses according to a distance signal of the distance sensing unit.

18 Claims, 4 Drawing Sheets

(58) Field of Classification Search
USPC ......................................................... 351/158
See application file for complete search history.

(56) References Cited

U.S. PATENT DOCUMENTS

| | | | |
|---|---|---|---|
| 2011/0240383 A1* | 10/2011 | Gettings | B62D 55/08 |
| | | | 180/9.1 |
| 2015/0351965 A1* | 12/2015 | Umentum | A47F 1/08 |
| | | | 2/427 |
| 2018/0190011 A1* | 7/2018 | Platt | G02B 27/017 |
| 2018/0292679 A1 | 10/2018 | Mou et al. | |
| 2020/0310376 A1* | 10/2020 | Hyde | G05B 19/0428 |
| 2022/0252887 A1* | 8/2022 | Nortrup | G02B 27/0093 |
| 2023/0314819 A1* | 10/2023 | Huang | G02B 27/0176 |
| | | | 345/80 |

FOREIGN PATENT DOCUMENTS

| | | |
|---|---|---|
| CN | 207516663 U | 6/2018 |
| CN | 209075218 U | 7/2019 |
| CN | 111025685 A | 4/2020 |
| CN | 210401874 U | 4/2020 |
| CN | 112782869 A | 5/2021 |
| CN | 113160520 A | 7/2021 |
| CN | 215006110 U | 12/2021 |
| CN | 114991800 A | 9/2022 |
| CN | 115308905 A | 11/2022 |
| CN | 115629489 A | 1/2023 |
| JP | 2018-180532 A | 11/2018 |

\* cited by examiner

AUTOMATIC RIGHTING SYSTEM AND METHOD, AND GLASSES

CROSS-REFERENCE TO RELATED APPLICATION(S)

This application claims priority to Chinese Patent Application No. 202211144165.7 filed Sep. 20, 2022, the disclosure of which is incorporated herein by reference in its entirety.

TECHNICAL FIELD

The present disclosure relates to the field of wearable technology and, in particular, to an automatic righting system and method, and glasses.

BACKGROUND

With the advancement of science and technology, VR glasses, AR glasses, and XR glasses become commonly used electronic products.

VR glasses, AR glasses, and XR glasses are overweight due to components such as lenses, circuit boards, and fans at front ends of the glasses, while there are fewer components at back ends of the glasses, so that the back ends are lighter. Thus, there is a problem that the glasses are top-heavy and easily skew and slide during the wearing process, and the user has to manually right the glasses frequently. However, when the user is inconvenient in both hands, the user cannot right the glasses. As a result, the use effect is poor.

SUMMARY

The present disclosure provides an automatic righting system and method, and glasses, which can automatically right glasses and have high automaticity and convenience.

The present disclosure provides the solutions below.

The automatic righting system includes a discrimination calibration module, a righting module, and a controller.

The discrimination calibration module includes a distance sensing unit. The distance sensing unit is located at the front end of the glasses and configured to acquire the distance between the distance sensing unit and a first feature position.

The righting module includes a push-up air cushion. The push-up air cushion is mounted at the front end of the glasses. The push-up air cushion is configured to be inflated to push the glasses to move upward.

The controller is electrically connected the distance sensing unit and the push-up air cushion. The controller is configured to control the push-up air cushion to start or stop to right the glasses according to a distance signal of the distance sensing unit.

Optionally, the discrimination calibration module also includes a touch sensing unit located at the back end of the glasses. The touch sensing unit is configured to be triggered by sliding and capable of monitoring the sliding distance of the touch sensing unit relative to a second feature position. The controller is electrically connected to the touch sensing unit and is configured to acquire the sliding distance of the touch sensing unit.

Optionally, a plurality of distance sensing units are provided, and the plurality of distance sensing units are disposed at intervals on the outer surface of a frame.

Optionally, the righting module also includes a plurality of clamping air cushions. A part of the plurality of clamping air cushions is mounted on the inside of one temple of the glasses, and the other part of the plurality of clamping air cushions is mounted on the inside of the other temple of the glasses. The controller is electrically connected to the plurality of clamping air cushions and is configured to control the clamping air cushions to start or stop.

Optionally, the push-up air cushion is mounted at the nose pad groove of the frame.

An automatic righting method is applicable to the preceding automatic righting system and includes the steps below.

In step S1, an initial distance is acquired. The initial distance is the distance which is between the distance sensing unit and the first feature position and recorded by the distance sensing unit when the glasses are in a comfortable position.

In step S2, a first distance is acquired. The first distance is the distance which is between the distance sensing unit and the first feature position and recorded by the distance sensing unit at the current moment.

In step S3, it is determined whether the first distance is greater than or equal to a to-be-righted distance. If so, step S4 is executed. If not, step S5 is executed.

In step S4, the push-up air cushion is controlled to start or stop according to the first distance and the initial distance so that the push-up air cushion is inflated to right the glasses.

In step S5, step S3 is executed after a preset duration.

Optionally, step S4 includes the steps below.

In step S41, the push-up air cushion is controlled to start, and the real-time distance between the distance sensing unit and the first feature position is recorded in real time through the distance sensing unit.

In step S42, when the real-time distance is equal to or less than the initial distance, the push-up air cushion is controlled to stop.

Optionally, the discrimination calibration module also includes a touch sensing unit. The automatic righting method includes the steps below.

A sliding distance is acquired. The sliding distance is a distance which is monitored by the touch sensing unit, and the sliding distance is the distance for which the touch sensing unit slides relative to the second feature position when the glasses slide from the comfortable position to a to-be-righted position.

In step S4, when the distance for which the touch sensing unit moves reversely is 60% of the sliding distance, the inflation rate of the push-up air cushion is controlled to decrease.

Optionally, the righting module also includes a plurality of clamping air cushions. After the glasses are righted, the automatic righting method also includes the steps below.

The plurality of clamping air cushions are controlled to start. The plurality of clamping air cushions are inflated to increase the distance between two temples.

The glasses include a frame, temples, and the preceding automatic righting system.

The distance sensing unit and the push-up air cushion are each mounted on the frame. The controller is disposed in the frame or the temples.

The automatic righting system and method, and glasses provided by the present disclosure have at least the beneficial effects below.

The distance sensing unit acquires the distance between the distance sensing unit and the first feature position and transmits the distance to the controller. The controller determines whether to control the push-up air cushion to start or not according to the distance, and controls the push-up air cushion to start when the glasses need to be righted. The push-up air cushion can be inflated to push the frame of the glasses to move upward. The controller controls the push-up air cushion to stop after the frame moves to a proper position. In this manner, the automatic righting the glasses is implemented, and a user does not need to manually push the glasses, thereby improving the convenience of righting glasses.

Figure 1:
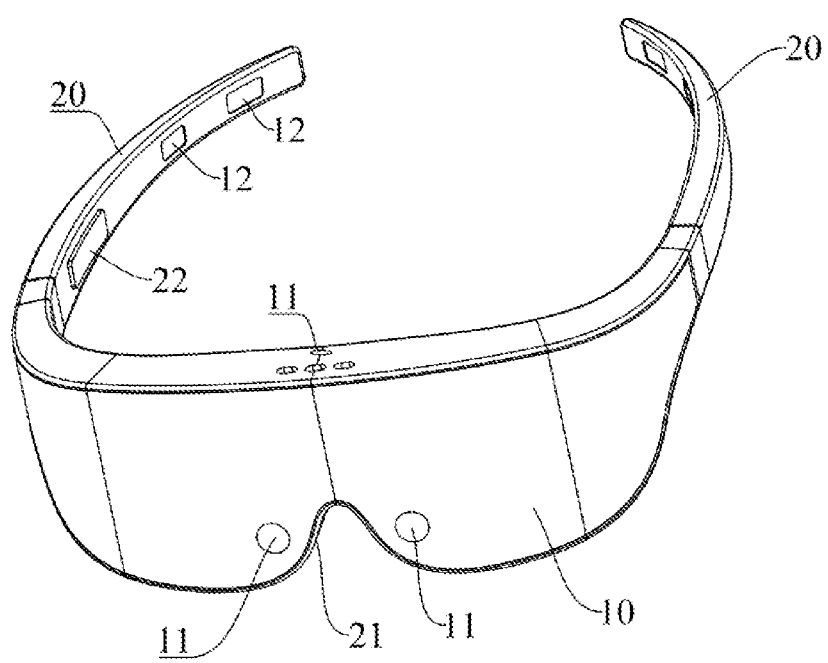
FIG. 1 is a view of glasses from an angle according to an embodiment of the present disclosure.

REFERENCE LIST 11 distance sensing unit
12 touch sensing unit
2 righting module
21 push-up air cushion
22 clamping air cushion
10 frame
20 temple

DETAILED DESCRIPTION

To make problems to be solved, adopted solutions and achieved effects of the present disclosure clearer, solutions of the present disclosure are further described below through embodiments in conjunction with drawings. It is to be understood that the embodiments described herein are merely intended to explain the present disclosure and not to limit the present disclosure. In addition, it should be noted that for ease of description, only the part, instead of all, related to the present disclosure is illustrated in the drawings.

In the description of the present disclosure, unless otherwise expressly specified and limited, the term "connected to each other", "connected" or "secured" is to be construed in a broad sense, for example, as securely connected, detachably connected or integrated; mechanically connected or electrically connected; directly connected to each other or indirectly connected to each other via an intermediary; or internally connected between two components or interaction relations between two components. For those of ordinary skill in the art, specific meanings of the preceding terms in the present disclosure may be construed based on specific situations.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of this embodiment, the orientation or position relationships indicated by terms "above", "below", "right" and the like are based on the orientation or position relationships shown in the drawings, merely for ease of description and simplifying an operation, and these relationships do not indicate or imply that the referred device or element has a specific orientation and is constructed and operated in a specific orientation, and thus it is not to be construed as limiting the present disclosure. In addition, the terms "first" and "second" are used only to distinguish between descriptions and have no special meaning.

Embodiment One

This embodiment provides an automatic righting system. The system is applicable to glasses and can push the glasses to move when the glasses skew or slide. In this manner, a user does not need to manually push the glasses, and the automatic righting of the glasses can be implemented. It is to be noted that the glasses in this embodiment are smart glasses such as VR glasses, AR glasses, and XR glasses.

Figure 2:
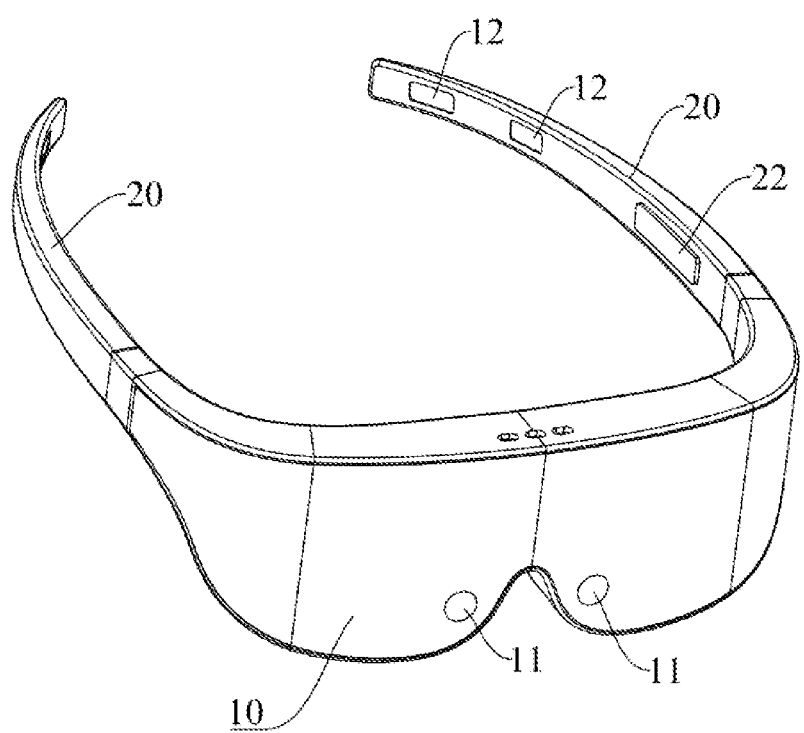
FIG. 2 is a view of the glasses from another angle according to an embodiment of the present disclosure.
Figure 3:
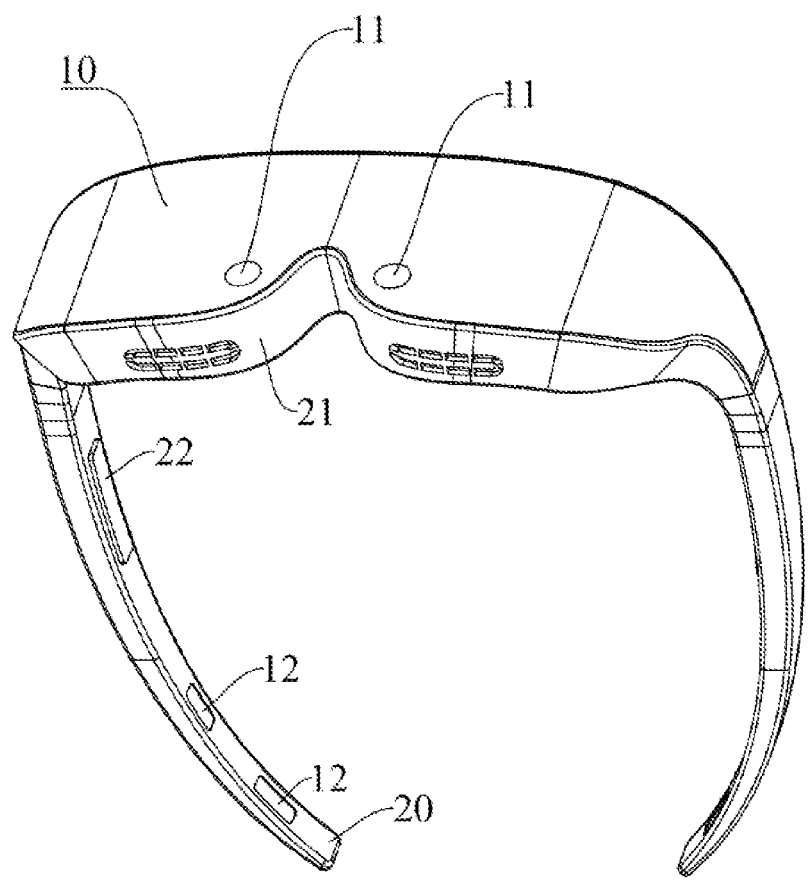
FIG. 3 is a view of the glasses from another angle according to an embodiment of the present disclosure.

As shown in FIGS. 1 to 3, the automatic righting system includes a discrimination calibration module, a righting module 2, and a controller.

The discrimination calibration module includes a distance sensing unit 11. The distance sensing unit 11 is located at the front end of the glasses. As shown in FIG. 1, the distance sensing unit 11 is specifically located on the front surface of a frame. The distance sensing unit 11 is configured to acquire the distance between the distance sensing unit 11 and a first feature position. The first feature position may be a point on the user's face that is easy to acquire, such as the user's nose tip, nose bone, and eyebrows. Preferably, it is better to select an unchanged point on the user's face and use the point as the first feature position. In this embodiment, the distance sensing unit 11 may be a distance sensor or a camera.

The preceding righting module 2 is configured to push the slid glasses upward so that the glasses are in a proper position. Specifically, the righting module 2 includes a push-up air cushion 21. The push-up air cushion 21 may automatically be inflated after being powered on. The push-up air cushion 21 is mounted at the front end of the glasses and specifically between the frame and the user's nose. Thus, when the push-up air cushion 21 is inflated, the frame of the glasses can be pushed upward with the user's nose as a supporting point. In this embodiment, the push-up air cushion 21 is powered by a battery in the glasses. In some embodiments, the push-up air cushion 21 is mounted at the nose pad groove of the frame. The lower surface of the frame has a nose pad groove with the same shape as a nose, and the nose pad groove is used for clamping the nose. The push-up air cushion 21 is mounted at the nose pad groove to better push the frame to move.

The controller is electrically connected to the distance sensing unit 11 and the push-up air cushion 21. The controller is configured to control the push-up air cushion 21 to start or stop to right the glasses according to a distance signal of the distance sensing unit 11. Specifically, when the controller determines that the distance, which is acquired by the distance sensing unit 11 and is between the distance sensing unit 11 and the first feature position, is not an initial distance and is greater than or equal to a to-be-righted distance, it indicates that the glasses need to be righted. At this time, the push-up air cushion 21 is controlled to start, so that the push-up air cushion is inflated to push the frame of the glasses to move upward. During the upward movement, the controller acquires the distance which is acquired by the distance sensing unit 11 and is between the distance sensing unit 11 and the first feature position in real time. When the distance is equal to the initial distance, it indicates that the glasses are righted in place. At this time, the controller controls the push-up air cushion 21 to stop. In this manner, the automatic righting of the glasses is implemented. It is to be noted that the initial distance is the distance which is acquired by the distance sensing unit 11 and is between the distance sensing unit 11 and the first feature position when the glasses are at the proper position on the user's face. The to-be-righted distance is the distance which is acquired by the distance sensing unit 11 and is between the distance sensing unit 11 and the first feature position when the frame of the glasses slides to a position where the glasses need to be righted. In this embodiment, the user may set the initial distance and the to-be-righted distance, that is, the user may set the comfortable position of the glasses (namely, the position of the glasses where the glasses are located to make the users feel comfortable) and the to-be-righted position of the glasses (namely, the position of the glasses where the glasses are needed to be righted). There may be different settings for different users.

In the automatic righting system provided by this embodiment, the distance sensing unit 11 acquires the distance between the distance sensing unit 11 and the first feature position and transmits the distance to the controller. The controller determines whether to control the push-up air cushion 21 to start or not according to the distance, and controls the push-up air cushion 21 to start when the glasses need to be righted. The push-up air cushion 21 is configured to be inflated to push the frame of the glasses to move upward. The controller controls the push-up air cushion 21 to stop after the frame moves to the proper position. In this manner, the automatic righting of the glasses is implemented, and the user does not need to manually push the glasses, thereby improving the convenience of glasses righting.

Optionally, referring to FIG. 1, the discrimination calibration module also includes a touch sensing unit 12. The touch sensing unit 12 is located at the back end of the glasses, specifically mounted on the temple of the glasses, and in contact with the user's face. The touch sensing unit 12 is configured to be triggered by sliding, that is, the touch sensing unit 12 can be automatically triggered when the touch sensing unit 12 senses that the touch sensing unit 12 moves relative to the user's face. The touch sensing unit 12 can monitor the sliding distance of the touch sensing unit 12 relative to a second feature position, that is, the touch sensing unit 12 can monitor the sliding distance when the touch sensing unit 12 slides on the user's face. The controller is electrically connected to the touch sensing unit 12 and is configured to acquire the sliding distance of the touch sensing unit 12, and control the push-up air cushion 21 according to the sliding distance and the distance signal. In this embodiment, the touch sensing unit 12 may be a touch sensor.

It is to be noted that the second feature position is the position of the user's face. In some embodiments, when the glasses are in a comfortable position, the position of the user's face in contact with the touch sensing unit 12 is the second feature position. It is to be noted that the method for the touch sensing unit 12 to acquire sliding may be referred to the method for a touch display panel to acquire the sliding length of the user's finger. The touch sensing unit 12 is similar to the touch display panel, and the skin at the second feature position is similar to the finger. Details are not repeated in this embodiment.

In some embodiments, the controller may control when to decrease the inflation rate of the push-up air cushion 21 according to the sliding distance. For example, during the upward movement of the glasses, when the distance for which the glasses move reversely is 60% of the sliding distance, the controller controls the inflation rate of the push-up air cushion 21 to decrease to prevent over-righting due to an excessive inflation rate.

Optionally, as shown in FIG. 1, a plurality of distance sensing units 11 are provided, and the plurality of distance sensing units 11 are disposed to ensure the accuracy of the distance signal. The plurality of distance sensing units 11 are disposed at intervals on the outer surface of the frame. The outer surface of the frame is specifically the surface of the frame that is not in contact with the user's face. The controller may determine whether the glasses has reached a to-be-righted position or not according to a plurality of distance signals of the plurality of distance sensing units 11, thereby preventing misjudgment. In FIG. 1, three distance sensing units 11 are disposed. Two distance sensing units 11 are disposed on the lower parts of the two lenses near a nose. One distance sensing unit 11 is located on the upper surface of the frame.

In this embodiment, as shown in FIGS. 2 and 3, the righting module 2 also includes a plurality of clamping air cushions 22. A part of the plurality of clamping air cushions 22 is mounted on the inside of one temple of the glasses, that is, between the temple and the user's face. The other part of the plurality of clamping air cushions 22 is mounted on the inside of the other temple of the glasses. The controller is electrically connected to the plurality of clamping air cushions 22 and is configured to control the clamping air cushions 22 to start or stop. When the clamping air cushions 22 are inflated, the distance between the temple and the user's face increases, and the distance between two temples increases. Under the action of the deformation forces of the temples, the two temples clamps the face, so that the entire glasses can be firmly fixed on the user's face. The clamping air cushions 22 may be used in conjunction with the push-up air cushion 21. After the push-up air cushion 21 rights the glasses to the comfortable position, the clamping air cushions 22 are started to better fix the glasses in the comfortable position. In this embodiment, as shown in FIGS. 2 and 3, two clamping air cushions 22 are disposed on each temple.

In the automatic righting system provided in this embodiment, the automatic righting of the glasses can be implemented, the structure is simple, and the reliability is high. The clamping air cushions 22 are disposed, so that the firmness of the glasses when the user wears glasses can be improved.

Embodiment Two

This embodiment provides a type of glasses. As shown in FIGS. 1 to 3, the glasses include a frame 10, temples 20, and the automatic righting system described in embodiment one. In this embodiment, the glasses may be AR glasses, VR glasses, or XR glasses. This is not limited in this embodiment.

The distance sensing unit 11 and the push-up air cushion 21 are each mounted on the frame 10. The controller is disposed in the frame 10 or the temples 20. The glasses also include a battery and a control button. The battery is configured to provide electrical energy for the distance sensing unit 11, the push-up air cushion 21, and the controller. The control button may be used for inputting a set command.

The glasses provided by this embodiment include an automatic righting system. In the automatic righting system, the distance sensing unit 11 acquires the distance between the distance sensing unit 11 and the first feature position and transmits the distance to the controller. The controller determines whether to control the push-up air cushion 21 to start or not according to the distance, and controls the push-up air cushion 21 to start when the glasses need to be righted. The push-up air cushion 21 is configured to be inflated to push the frame of the glasses to move upward. The controller controls the push-up air cushion 21 to stop after the frame moves to the proper position. In this manner, the automatic righting of the glasses is implemented, and the user does not need to manually push the glasses, thereby improving the convenience of glasses righting.

Embodiment Three

Figure 4:
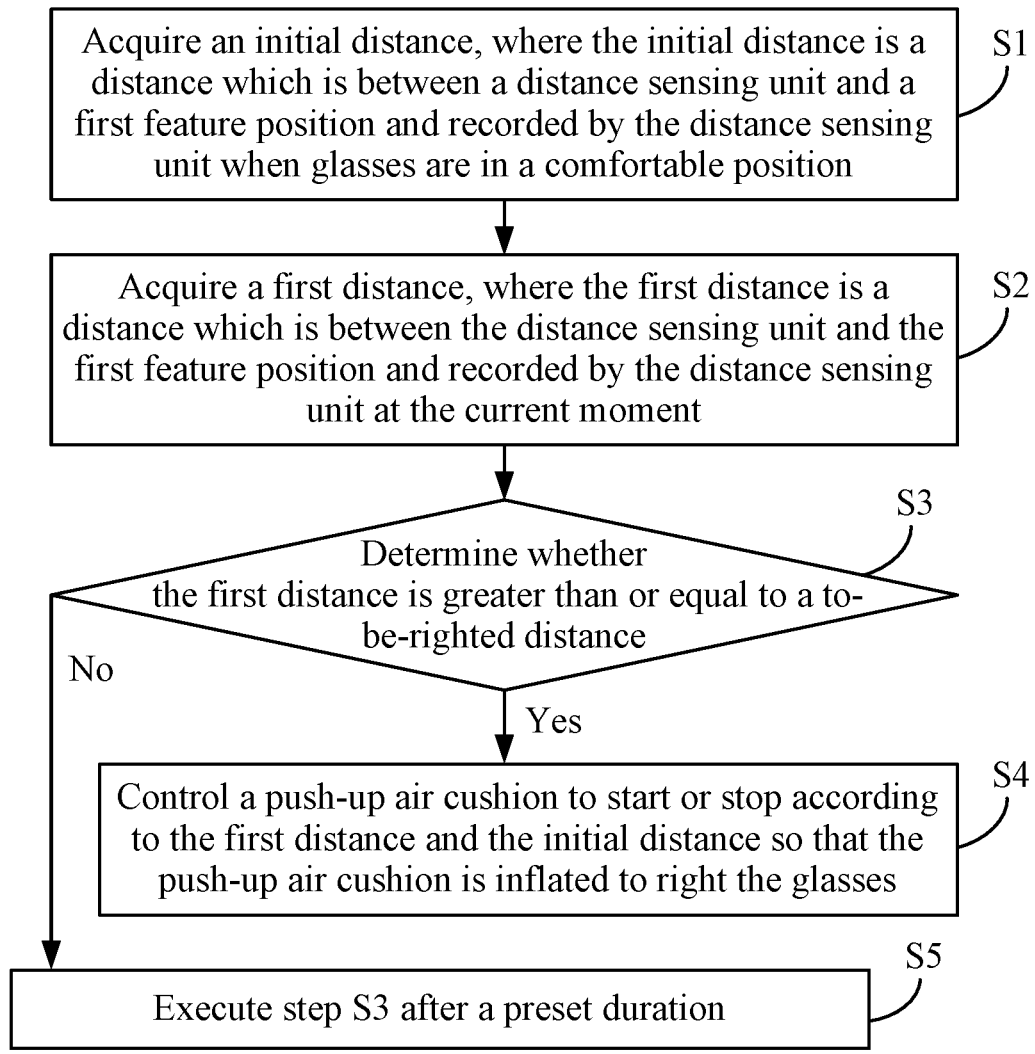
FIG. 4 is a flowchart of an automatic righting method according to an embodiment of the present disclosure.

This embodiment provides an automatic righting method. The method is applicable to the automatic righting system in embodiment one. As shown in FIG. 4, the automatic righting method includes the steps below.

In step S1, the initial distance is acquired. The initial distance is the distance which is between the distance sensing unit 11 and the first feature position and recorded by the distance sensing unit 11 when the glasses are in the comfortable position.

The comfortable position of the glasses refers to a position where the glasses are located when the user feels comfortable and after the user wears the glasses on the user's face. The position may be configured by the user. The first feature position may be a point on the user's face that is easy to acquire, such as the user's nose tip, nose bone, and eyebrows. Preferably, it is better to select an unchanged point on the user's face and use the point as the first feature position. It is to be noted that the initial distance is acquired or set by the controller.

Optionally, in this embodiment, after the initial distance is acquired, in order to improve a processing speed, the controller may convert the initial distance to an ADC value and define this value as threshold value A.

In step S2, the first distance is acquired. The first distance is the distance which is between the distance sensing unit 11 and the first feature position and recorded by the distance sensing unit 11 at the current moment.

In this embodiment, the first distance may be equal to the initial distance, that is, the distance recorded by the distance sensing unit 11 when the glasses do not slide. It is to be noted that the first distance is acquired by the controller.

In step S3, it is determined whether the first distance is greater than or equal to the to-be-righted distance. If so, step S4 is executed. If not, step S5 is executed.

The to-be-righted distance is a distance which is recorded by the distance sensing unit 11 and is between the distance sensing unit 11 and the first feature position when the frame of the glasses slides to the to-be-righted position. The distance may be preset by the user. When the first distance is greater than or equal to the to-be-righted distance, it indicates that the frame of the glasses have slid to the to-be-righted position. At this time, the controller may control the push-up air cushion 21 to start. It is to be noted that the to-be-righted distance is acquired or set by the controller.

In this embodiment, after a processor obtains the to-be-righted distance, in order to improve a processing speed, the controller may convert the to-be-righted distance to an ADC value and define this value as threshold value B. When the ADC value corresponding to the first distance triggers threshold value B, the controller controls the push-up air cushion 21 to start.

In step S4, the push-up air cushion 21 is controlled to start or stop according to the first distance and the initial distance so that the push-up air cushion 21 is inflated to right the glasses.

The preceding righting module 2 is configured to push the slid glasses upward so that the glasses are in the proper position. Specifically, the righting module 2 includes a push-up air cushion 21. The push-up air cushion 21 may automatically be inflated after being powered on. The push-up air cushion 21 is mounted at the front end of the glasses and specifically between the frame and the user's nose. Thus, when the push-up air cushion 21 is inflated, the frame of the glasses can be pushed upward with the user's nose as the supporting point. In this embodiment, the push-up air cushion 21 is powered by the battery in the glasses. In some embodiments, the push-up air cushion 21 is mounted at the nose pad groove of the frame. The lower surface of the frame has the nose pad groove with the same shape as the nose, and the nose pad groove is used for clamping the nose. The push-up air cushion 21 is mounted at the nose pad groove to better push the frame to move.

In step S5, step S3 is executed after the preset duration.

In step S5, the controller controls the cyclic execution of steps S3 and S4 to periodically detect whether the frame needs to be righted. The preset duration may be set according to actual requirements, such as 0.1 second, 0.5 second, and 1 second. This is not limited in this embodiment.

In the automatic righting method of the automatic righting system provided in this embodiment, the distance sensing unit 11 acquires the distance between the distance sensing unit 11 and the first feature position and transmits the distance to the controller. The controller determines whether to control the push-up air cushion 21 to start or not according to the distance, and controls the push-up air cushion 21 to start when the glasses need to be righted. The push-up air cushion 21 is configured to be inflated to push the frame of the glasses to move upward. The controller controls the push-up air cushion 21 to stop after the frame moves to the proper position. In this manner, the automatic righting of the glasses is implemented, and the user does not need to manually push the glasses, thereby improving the convenience of glasses righting.

Optionally, step S4 includes the steps below.

In step S41, the push-up air cushion 21 is controlled to start, and the real-time distance between the distance sensing unit 11 and the first feature position is recorded in real time through the distance sensing unit 11.

During the righting process, it is necessary for the distance sensing unit 11 to record the real-time distance between the distance sensing unit 11 and the first feature position in real time to determine whether the frame is righted in place. In this embodiment, the acquisition interval or the record interval of the distance sensing unit 11 may be set according to actual requirements, such as 0.1 second, 0.5 second, and 1 second. This is not limited in this embodiment. To prevent the problem of over-righting, the acquisition interval or the record interval should not be too large.

In step S42, when the real-time distance is equal to or less than the initial distance, the push-up air cushion 21 is controlled to stop.

In step S42, when the real-time distance is less than or equal to the initial distance, it indicates that the frame is righted in place and is already in the comfortable position. At this time, the controller may control the push-up air cushion 21 to stop to complete the righting of the glasses.

Optionally, when the discrimination calibration module includes a touch sensing unit 12. The automatic righting method includes the steps below.

The sliding distance is acquired. The sliding distance is a distance which is monitored by the touch sensing unit 12, and the sliding distance is the distance for which the touch sensing unit 12 slides relative to the second feature position when the glasses slide from the comfortable position to the to-be-righted position.

It is to be noted that when the glasses start to slide, the touch sensing unit 12 monitors the distance between the touch sensing unit 12 and the second feature position in real time until the controller controls the push-up air cushion 21 to start. The distance recorded before the push-up air cushion 21 is opened is used as the sliding distance. When the push-up air cushion 21 is opened, the controller immediately acquires the sliding distance. The second feature position is the position of the user's face. In some embodiments, when the glasses are in the comfortable position, the position of the user's face in contact with the touch sensing unit 12 is the second feature position.

In step S4, when the distance for which the touch sensing unit 12 moves reversely is 60% of the sliding distance, the inflation rate of the push-up air cushion 21 is controlled to decrease.

The reverse movement of the touch sensing unit 12 may be considered that the moving direction of the touch sensing unit 12 is opposite to the sliding direction when the glasses slide. During the righting process, when the distance for which the touch sensing unit 12 moves reversely is 60% of the sliding distance, it indicates that the glasses are about to reach the comfortable position. At this time, if the inflation rate of the push-up air cushion 21 is still large, it is easy to cause over-righting. For this reason, the controller may control the inflation rate of the push-up air cushion 21 to decrease, so that the glasses slowly move to the comfortable position.

Optionally, in the case where the righting module 2 includes a plurality of clamping air cushions 22, and after the glasses are righted, the automatic righting method also includes the steps below.

The clamping air cushions 22 are controlled to start. The clamping air cushions 22 are inflated to increase the distance between two temples, thereby improving the firmness of the glasses when the glasses are worn on the user's face. In this manner, the glasses do not slide again in a short time.

What is claimed is:

1. An automatic righting system, comprising:
    a discrimination calibration module comprising a distance sensing unit, wherein the distance sensing unit is configured to be located at a front end of glasses and configured to acquire a distance between the distance sensing unit and a first feature position;
    a righting module comprising a push-up air cushion, wherein the push-up air cushion is configured to be mounted at the front end of the glasses, and the push-up air cushion is configured to be inflated to push the glasses to move upward; and
    a controller electrically connected to the distance sensing unit and the push-up air cushion, wherein the controller is configured to control the push-up air cushion to start or stop to right the glasses according to a distance signal of the distance sensing unit.

2. The automatic righting system according to claim 1, wherein the discrimination calibration module further comprises a touch sensing unit configured to be located at a back end of the glasses, wherein the touch sensing unit is configured to be triggered by sliding, and capable of monitoring a sliding distance of the touch sensing unit relative to a second feature position, and the controller is electrically connected to the touch sensing unit and is configured to acquire the sliding distance of the touch sensing unit.

3. The automatic righting system according to claim 1, wherein a plurality of distance sensing units are provided, wherein the plurality of distance sensing units are configured to be disposed at intervals on an outer surface of a frame.

4. The automatic righting system according to claim 1, wherein the righting module further comprises a plurality of clamping air cushions, wherein a part of the plurality of clamping air cushions is configured to be mounted on an inside of one temple of the glasses, and another part of the plurality of clamping air cushions is configured to be mounted on an inside of another temple of the glasses; and the controller is electrically connected to the plurality of clamping air cushions and is configured to control the plurality of clamping air cushions to start or stop.

5. The automatic righting system according to claim 1, wherein the push-up air cushion is configured to be mounted at a nose pad groove of a frame.

6. Glasses, comprising a frame, temples, and the automatic righting system according to claim 1, wherein the distance sensing unit and the push-up air cushion are each mounted on the frame, and the controller is disposed in the frame or the temples.

7. The glasses according to claim 6, wherein the discrimination calibration module further comprises a touch sensing unit configured to be located at a back end of the glasses, wherein the touch sensing unit is configured to be triggered by sliding, and capable of monitoring a sliding distance of the touch sensing unit relative to a second feature position, and the controller is electrically connected to the touch sensing unit and is configured to acquire the sliding distance of the touch sensing unit.

8. The glasses according to claim 6, wherein a plurality of distance sensing units are provided, wherein the plurality of distance sensing units are configured to be disposed at intervals on an outer surface of a frame.

9. The glasses according to claim 6, wherein the righting module further comprises a plurality of clamping air cushions, wherein a part of the plurality of clamping air cushions is configured to be mounted on an inside of one temple of the glasses, and another part of the plurality of clamping air cushions is configured to be mounted on an inside of another temple of the glasses; and the controller is electrically connected to the plurality of clamping air cushions and is configured to control the plurality of clamping air cushions to start or stop.

10. The glasses according to claim 6, wherein the push-up air cushion is configured to be mounted at a nose pad groove of a frame.

11. An automatic righting method, applicable to an automatic righting system, wherein the automatic righting system comprises:
    a discrimination calibration module comprising a distance sensing unit, wherein the distance sensing unit is configured to be located at a front end of glasses and configured to acquire a distance between the distance sensing unit and a first feature position;

a righting module comprising a push-up air cushion, wherein the push-up air cushion is configured to be mounted at the front end of the glasses, and the push-up air cushion is configured to be inflated to push the glasses to move upward; and a controller electrically connected to the distance sensing unit and the push-up air cushion, wherein the controller is configured to control the push-up air cushion to start or stop to right the glasses according to a distance signal of the distance sensing unit, and the automatic righting method comprises following steps:

in step S1, acquiring an initial distance, wherein the initial distance is a distance which is between the distance sensing unit and the first feature position and recorded by the distance sensing unit when the glasses are in a comfortable position;

in step S2, acquiring a first distance, wherein the first distance is a distance which is between the distance sensing unit and the first feature position and recorded by the distance sensing unit at a current moment;

in step S3, determining whether the first distance is greater than or equal to a to-be-righted distance, if so, executing step S4, and if not, executing step S5;

in the step S4, controlling the push-up air cushion to start or stop according to the first distance and the initial distance so that the push-up air cushion is inflated to right the glasses; and in the step S5, executing the step S3 after a preset duration.

12. The automatic righting method according to claim 11, wherein the discrimination calibration module further comprises a touch sensing unit configured to be located at a back end of the glasses, wherein the touch sensing unit is configured to be triggered by sliding, and capable of monitoring a sliding distance of the touch sensing unit relative to a second feature position, and the controller is electrically connected to the touch sensing unit and is configured to acquire the sliding distance of the touch sensing unit.

13. The automatic righting method according to claim 11, wherein a plurality of distance sensing units are provided, wherein the plurality of distance sensing units are configured to be disposed at intervals on an outer surface of a frame.

14. The automatic righting method according to claim 11, wherein the righting module further comprises a plurality of clamping air cushions, wherein a part of the plurality of clamping air cushions is configured to be mounted on an inside of one temple of the glasses, and another part of the plurality of clamping air cushions is configured to be mounted on an inside of another temple of the glasses; and the controller is electrically connected to the plurality of clamping air cushions and is configured to control the plurality of clamping air cushions to start or stop.

15. The automatic righting method according to claim 11, wherein the push-up air cushion is configured to be mounted at a nose pad groove of a frame.

16. The automatic righting method according to claim 11, wherein the step S4 comprises:

in step S41, controlling the push-up air cushion to start and recording a real-time distance between the distance sensing unit and the first feature position in real time through the distance sensing unit; and in step S42, when the real-time distance is equal to or less than the initial distance, controlling the push-up air cushion to stop.

17. The automatic righting method according to claim 11, wherein the discrimination calibration module further comprises a touch sensing unit, and the automatic righting method comprises following steps:

acquiring a sliding distance, wherein the sliding distance is a distance which is monitored by the touch sensing unit, and the sliding distance is the distance for which the touch sensing unit slides relative to a second feature position when the glasses slide from the comfortable position to a to-be-righted position;

in the step S4, when a distance for which the touch sensing unit moves reversely is 60% of the sliding distance, controlling an inflation rate of the push-up air cushion to decrease.

18. The automatic righting method according to claim 11, wherein the righting module further comprises a plurality of clamping air cushions; after the glasses are righted, the automatic righting method further comprises:

controlling the plurality of clamping air cushions to start, wherein the plurality of clamping air cushions are inflated to increase a distance between two temples.

* * * * *